G. F. MAPES.
TYPEWRITING MACHINE.
APPLICATION FILED FEB. 25, 1918.
1,346,605.
Patented July 13, 1920.
8 SHEETS—SHEET 1.
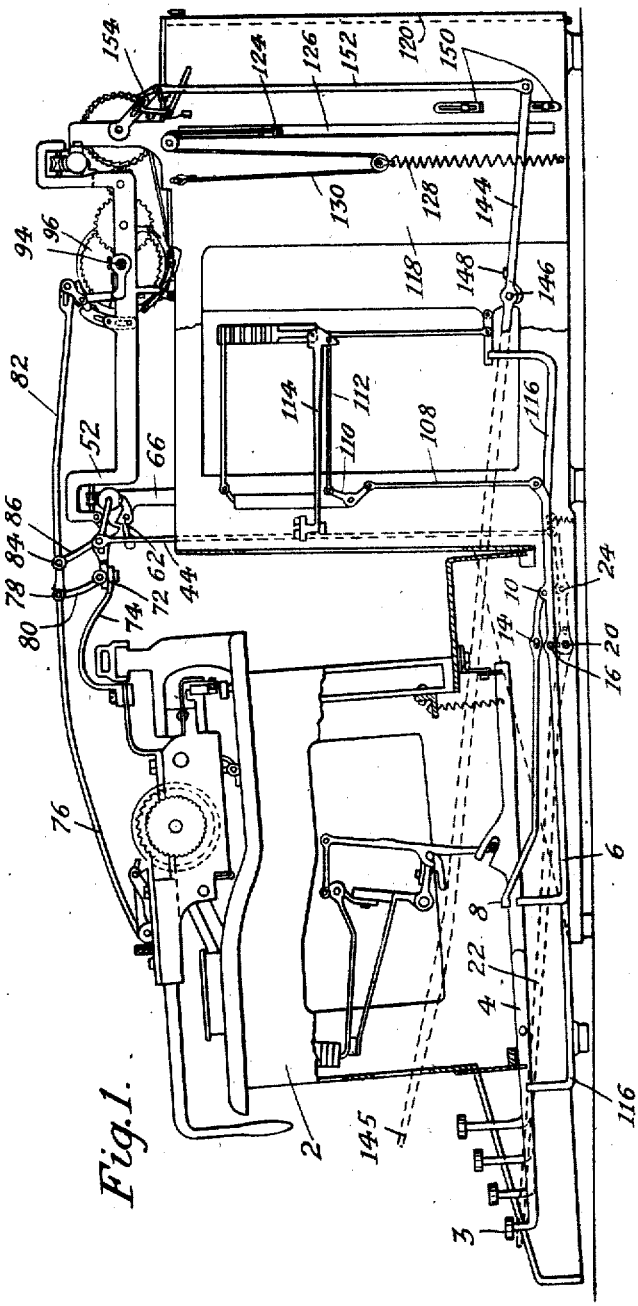
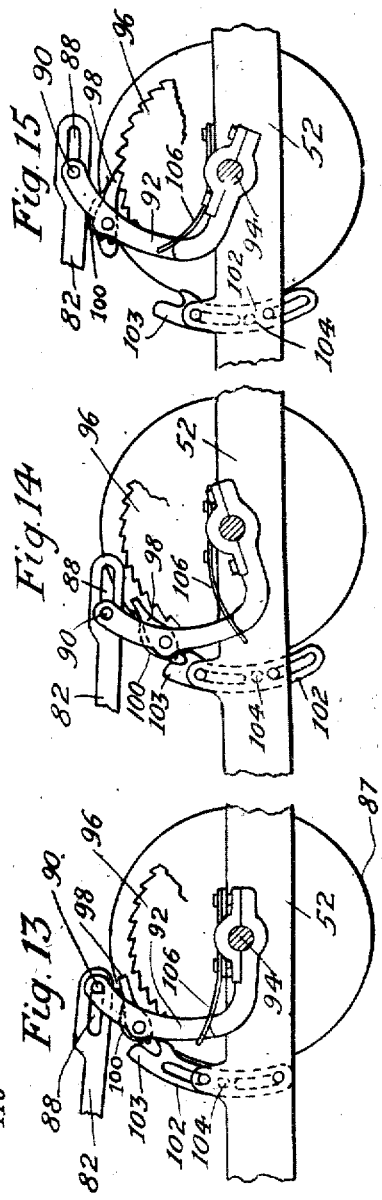
Inventor:
Gailen F. Mapes.
By Whiteley and Ruckman
his Attorneys.

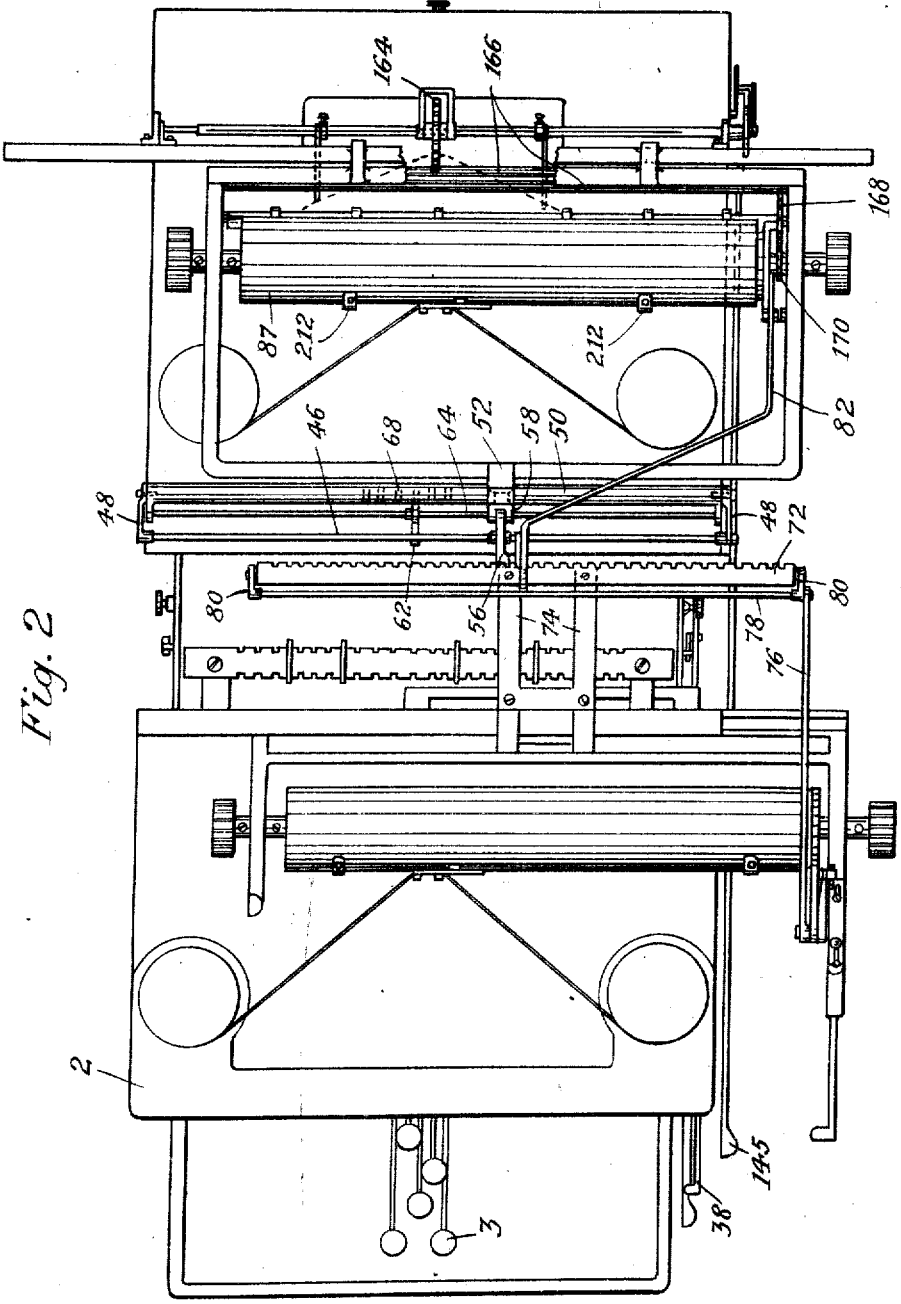

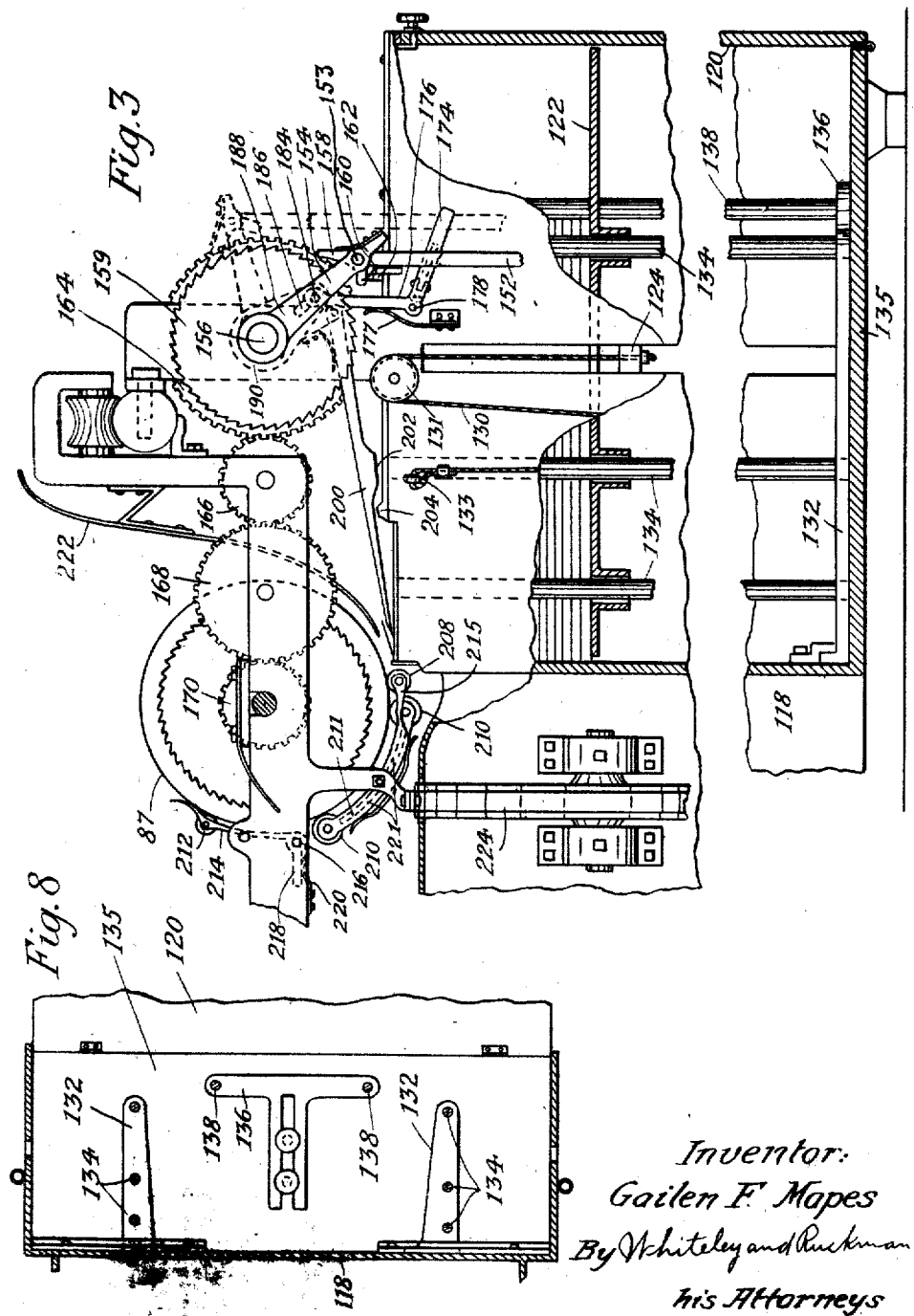

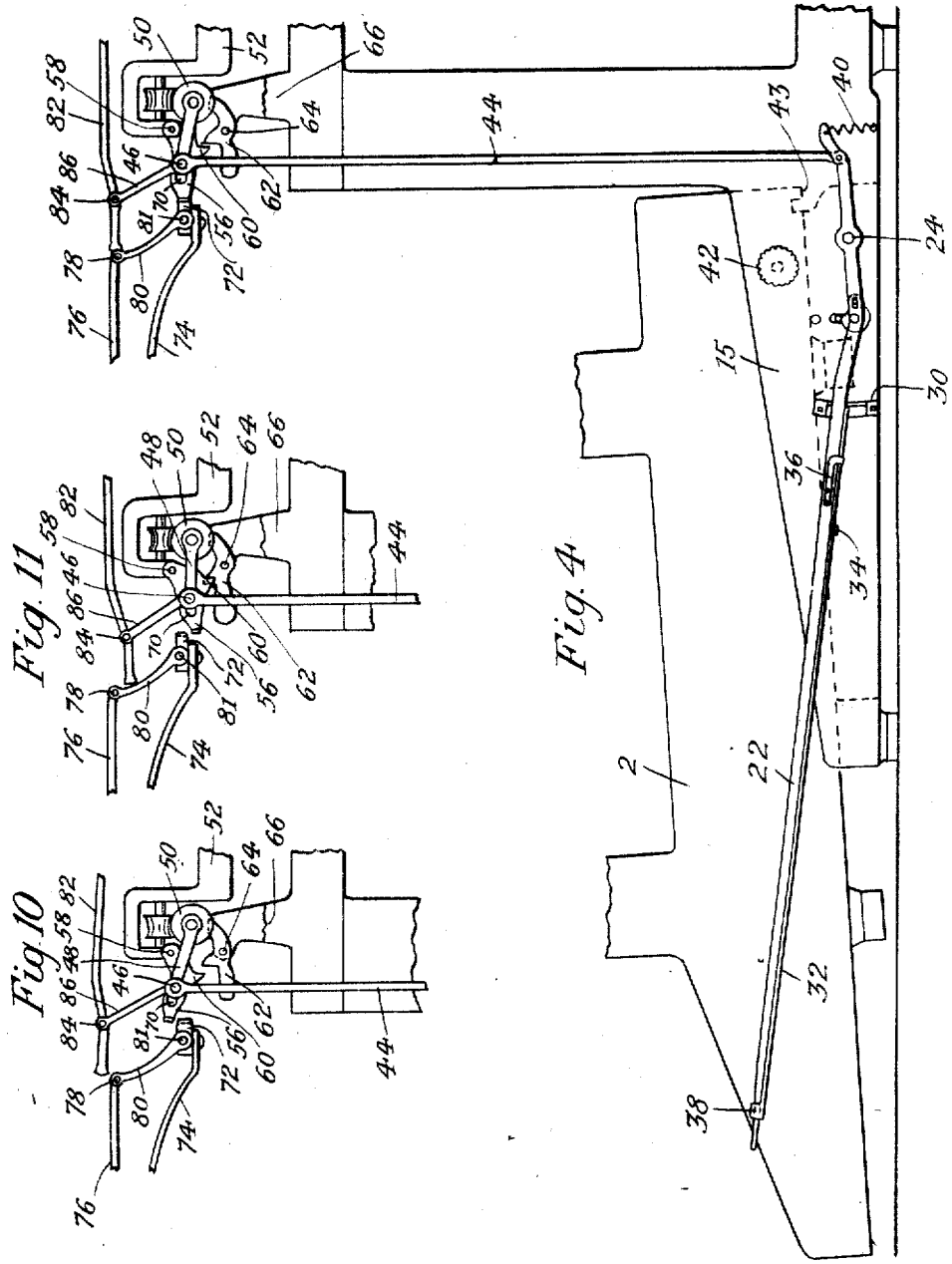

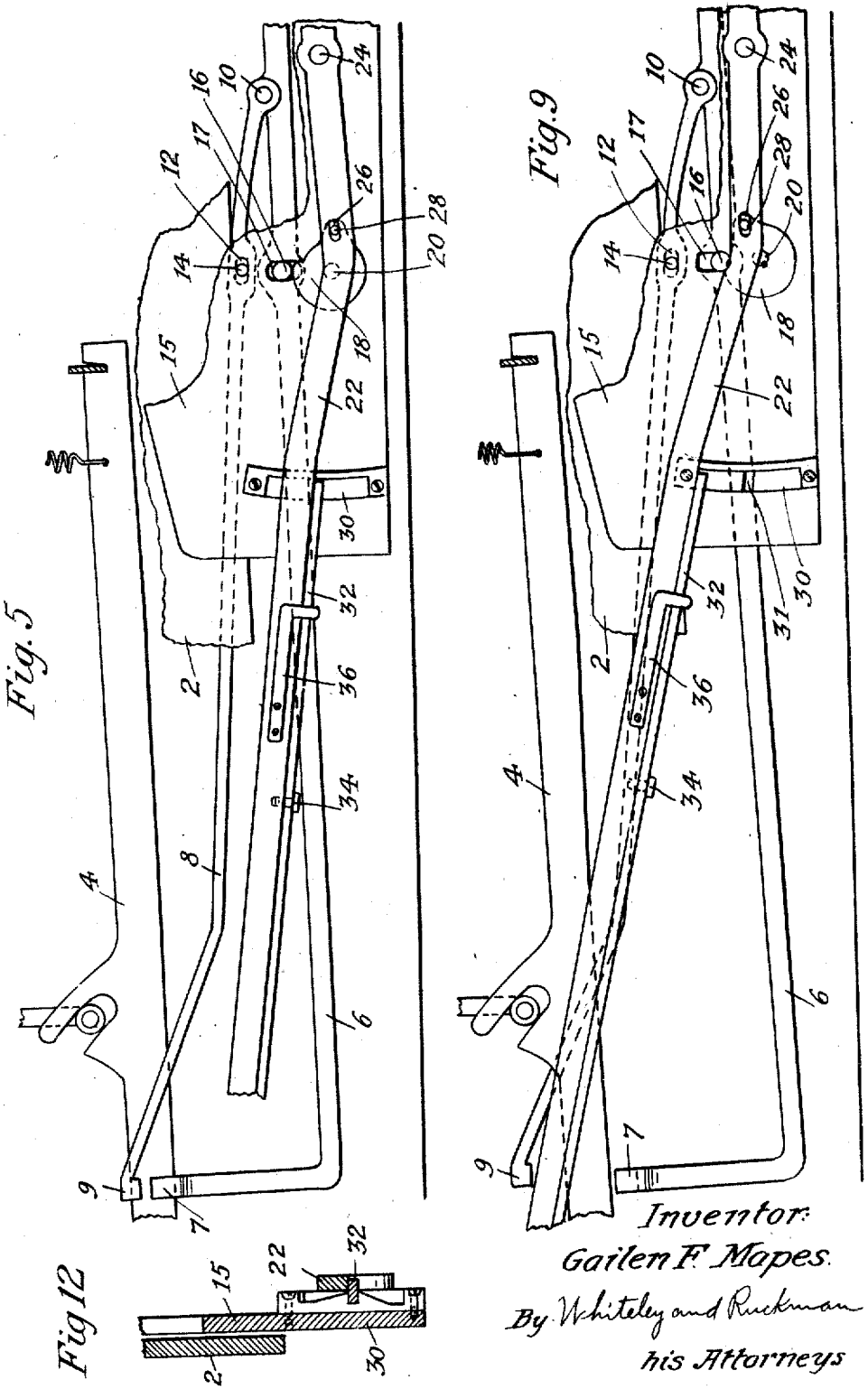

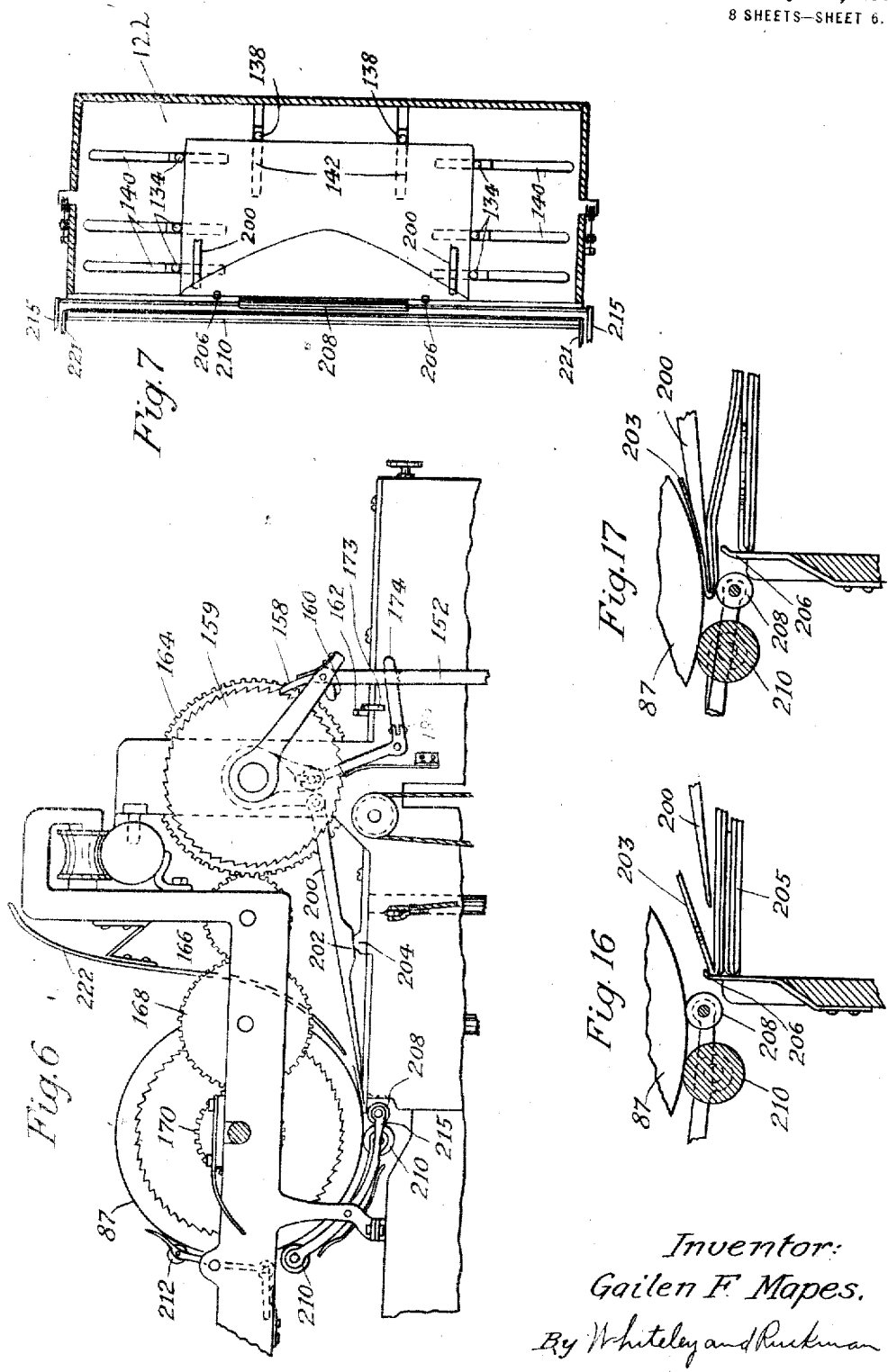

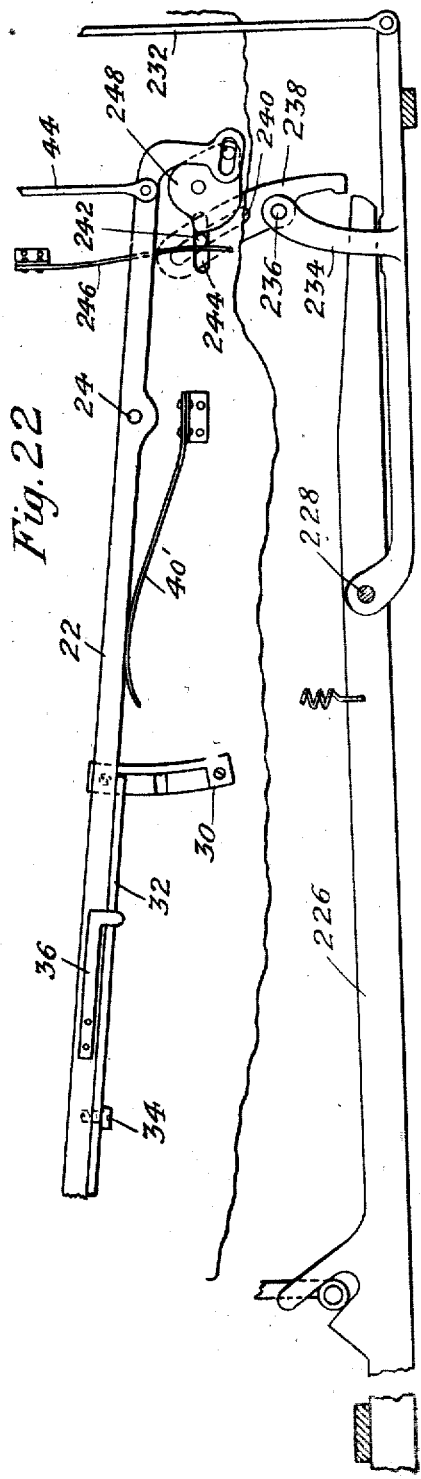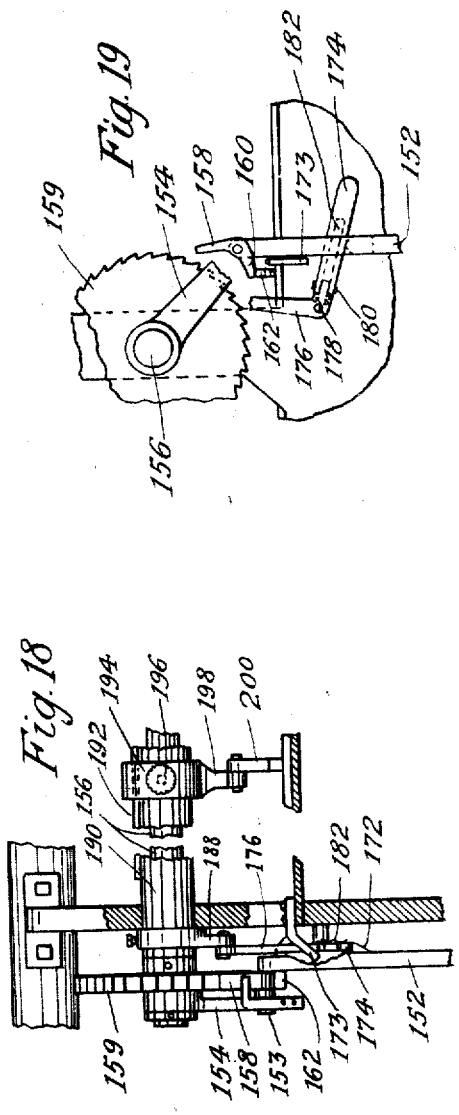

G. F. MAPES.
TYPEWRITING MACHINE.
APPLICATION FILED FEB. 25, 1918.
1,346,605.
Patented July 13, 1920.
8 SHEETS—SHEET 8.
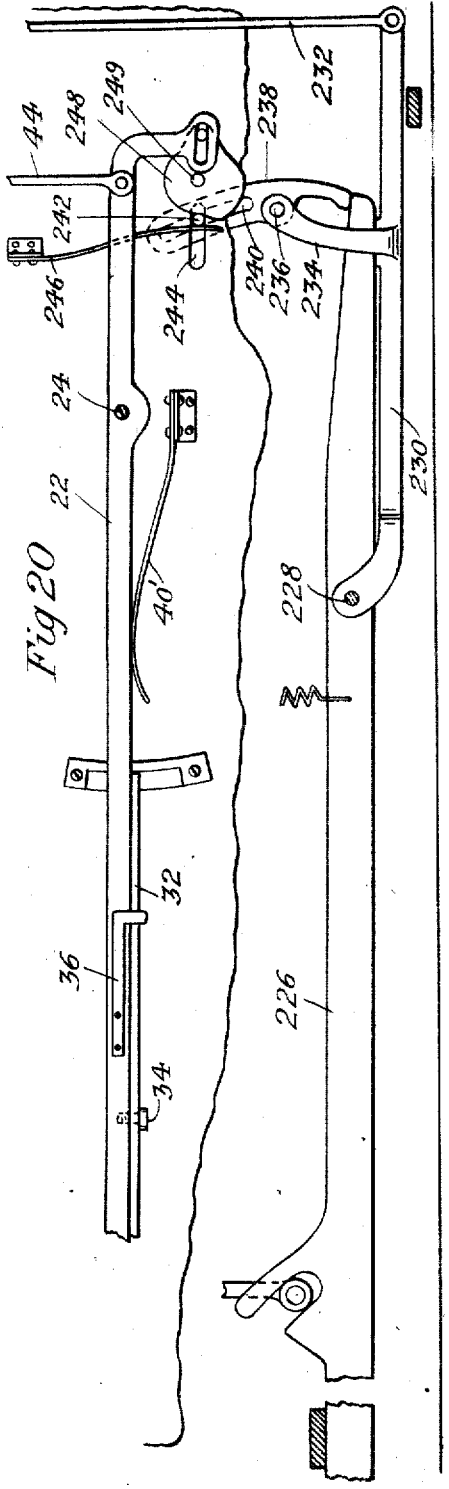
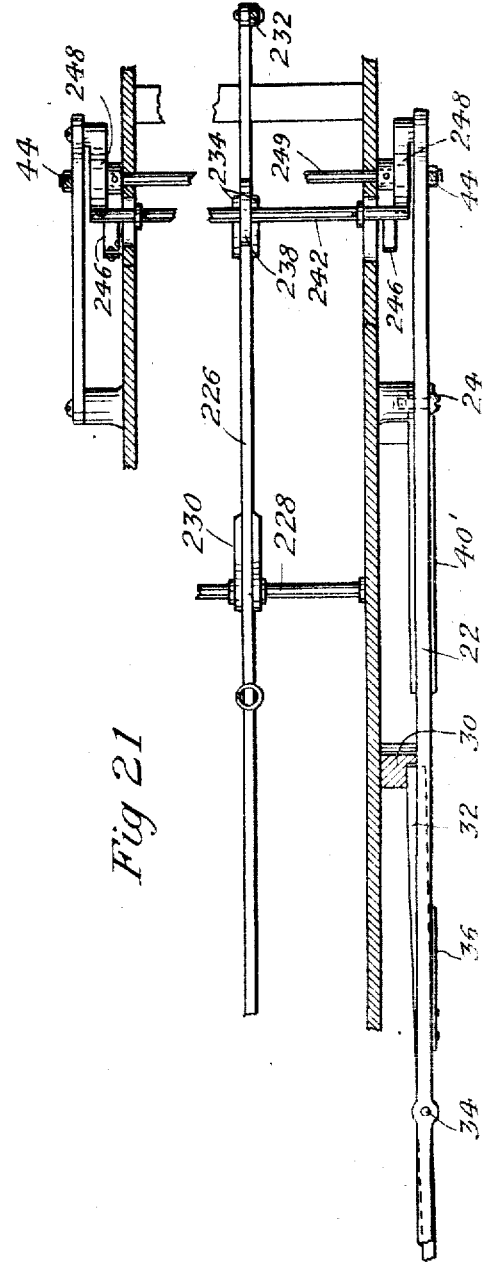
Inventor:
Gailen F. Mapes
By Whiteley and Ruckman
his Attorneys.

UNITED STATES PATENT OFFICE.

GAILEN F. MAPES, OF MINNEAPOLIS, MINNESOTA.

TYPEWRITING-MACHINE.

1,346,605.   Specification of Letters Patent.   Patented July 13, 1920.

Application filed February 25, 1918. Serial No. 218,953.

*To all whom it may concern:*

Be it known that I, GAILEN F. MAPES, a citizen of the United States, residing at Minneapolis, in the county of Hennepin and State of Minnesota, have invented certain new and useful Improvements in Typewriting-Machines, of which the following is a specification.

My invention relates to typewriting machines and more particularly to a device to be connected with the ordinary standard typewriter. The object broadly is the provision of mechanism by means of which envelops or work sheets associated with the attachment, or second machine as it will hereinafter be referred to, will have recorded thereon the same matter that is typewritten in the usual manner on the ordinary typewriter, or first machine as it will hereinafter be referred to. The object more particularly is to provide for typewriting on envelops the names and addresses of parties which at the same time are typewritten at the head of circular letters, bills or ordinary correspondence. These acts are performed simultaneously by the operator depressing the keys of the first machine in the ordinary manner. A further object is the provision of mechanism which will allow the carriage of the second machine to return to a selected position, proper for feeding in a new work piece when disconnected from the carriage of the first machine. A further object is the provision of mechanism whereby the rotation of the platen of the second machine may be stopped in a selected position to bring the work piece into the proper position for writing upon. A further object is the provision of mechanism by which the line spacing in either machine may be adjusted independently of that in the other machine. A further object is the provision of mechanism whereby, at the will of the operator, the second machine may be rigidly connected to operate in unison with the first, or disconnected to allow the free operation of the first machine, further provision being made to temporarily disconnect the carriages and line-spacing mechanism of the two machines so as to allow proper adjustment in relation to each other to begin writing properly.

The full objects and advantages of my invention will appear in connection with the detailed description thereof and are fully pointed out in the claims.

In the drawings, illustrating the application of my invention in one form, and also in a modified form,—

Figure 1 is a side view partly in section of the two machines connected for operation in unison. Fig. 2 is a top plan view. Fig. 3 is an enlarged side view partly in section of the magazine and feeding mechanism associated with the second machine. Fig. 4 is a side view of the operating mechanism for the carriage and line spacing mechanism of the second machine. Fig. 5 is an enlarged view of the key-bar connecting mechanism for the second machine. Fig. 6 is a detail view of the envelop-feeding mechanism. Fig. 7 is a top view in section of the magazine. Fig. 8 is a sectional view of the bottom of the magazine. Fig. 9 is an enlarged view of the key-bar connecting mechanism shown in open position. Fig. 10 is a detail view of the carriage and line-spacing connecting mechanism of the second machine. Fig. 11 is a view similar to Fig. 10 but showing the mechanism in the inoperative position. Fig. 12 is a detail of the catch for the lever controlling the carriage of the second machine. Fig. 13 is a detail view of the line-spacing mechanism of the second machine set for one space. Fig. 14 is a similar view showing the same mechanism set for three spaces. Fig. 15 is a view similar to Fig. 14 with the device in operation. Fig. 16 is a detail of the device for feeding envelops to the platen of the second machine. Fig. 17 is a view similar to Fig. 16 showing the device in operation. Fig. 18 is a detail rear view of the mechanism for rotating the platen and feeding work pieces to the second machine. Fig. 19 is a side view of the mechanism shown in Fig. 18. Fig. 20 is a side view of a modified form of key-connecting mechanism in the operative position. Fig. 21 is a top view of the same. Fig. 22 is a view similar to Fig. 20 showing the key-connecting mechanism in the inoperative position.

Referring to Figs. 1 to 19 which illustrate my invention in preferred form. 2 is the frame of an ordinary typewriter having keys 3 on the customary key-bars 4. 6 represent connecting bars operated by the key-bars 4 and having forked ends 7 engaging underneath the key-bars 4. 8 are bars having forked ends 9 to engage over said key-bars and are pivoted to the bars 6 at 10. 12 are slots in the bars 8, lying in which is a fixed rod 14 supported in the frame 15 of the second machine. 16 is a movable bearing rod for the bars 6 and it passes through slots 17 in the frame 15. 18 is a cam for moving the rod 16 and it is mounted on a rotatable rod 20 which carries a similar cam fixed to its opposite end, the rod being mounted in the frame 15. 22 is a lever for operating the cam 18 and the connecting mechanism and it is pivoted at 24 to the frame 15. Through a slot 26 in the lever 22 extends a projection 28 from the cam 18. 30 is a catch secured to the frame 15 and having a slot 31 as shown in Fig. 9. 32 is a catch lever pivoted at 34 on the lever 22 and 36 is a spring which tends to force the catch lever into engagement with the catch. The end 38 of the catch lever is within reach of the operator as shown in Fig. 4. A spring 40 at the rear end of the lever 22 tends to hold up the other end of said lever when it is released by the catch lever 32. Thumb screws 42, one on each side of the frame 15, are adapted to be screwed into engagement with the frame 2 to allow proper lateral adjustment of the two machines, and a slot 43 on the frame 15 receives a flange on the frame 2 and further assists in holding the two frames together. To the end of the lever 22 is pivoted a connecting rod 44 leading to the carriage and line-spacing mechanism of the second machine. Through the upper end of this rod extends a rod 46 mounted on the ends of two arms 48 which are pivoted on the track 50, there being one of these arms 48 at each end, as shown in Fig. 2. 52 represents the frame of the carriage of the second machine mounted in conventional manner. 56 is a gooseneck piece pivoted to the frame 52 at 58. 60 is a projection on the gooseneck and 62 is a stop pivoted on a rod 64 which is mounted on offset portions of the post 66. 68 represents teeth in the bottom of the track 50 (see Fig. 2) with which the end of the stop 62 is adapted to engage. 70 is a slot in the gooseneck piece 56 and the rod 46 extends through this slot. 72 is a rack supported by curved bars 74 secured to the carriage of the first machine as shown in Fig. 1. 76 is a bar connected to the spacing mechanism of the first machine and a rod 78 passes through this bar and arms 80 which are pivoted at 81 to the rack 72. An offset bar 82 is pivoted at 84 on an arm 86 mounted on rod 46. The rear end of the bar 82 turns the platen 87 of the second machine by the mechanism shown, particularly in Figs. 13, 14 and 15, Fig. 13 showing the device set for one space, Fig. 14 showing it set for three spaces and Fig. 15 showing the device operating to turn the platen. This mechanism will now be described. A slot 88 in the end of the bar 82 has lying in it a pin 90 on a curved bar 92 mounted on the axle 94 of the platen, a ratchet wheel 96 being secured to the latter. 98 is a pawl pivoted on the curved bar 92 and held down by a spring 100. 102 is an adjustable member having a tail 103, and this member can be held to the carriage frame 52 in a plurality of positions by means of a spring-pressed pull rod 104. The pawl 98 will be disengaged by the tail 103 according to the adjustment of the member 102 as shown in Figs. 13 and 14. 106 is a spring to force the bar 92 back to its original position.

Returning now to the levers 6, as shown in Fig. 1, to the rear ends of these levers are pivoted rods 108 having their upper ends pivoted to bell-cranks 110, and to the latter are pivoted rods 112 connected to the type-bars 114 of the second machine. 116 represents a capital shift rod operating in a manner known in the art.

Referring now to the magazine and envelop feeding device, shown best in Figs. 3, 7 and 8, 118 represents a magazine having a hinged door 120 and a movable bottom 122. Projections 124 from the movable bottom move in slots 126 in the sides of the magazine. Springs 128 act upon cords 130 running over pulleys 131 and tend to pull up the bottom, one end of the cords being secured to the projections 124 and the other end being detachably secured at 133 to the magazine in order that the bottom may be lowered for filling when the cords are detached. Mounted on the upper side of the stationary bottom 135 are longitudinally adjustable plates 132, best shown in Fig. 8, and mounted on these plates are upwardly-extending rods 134. Also mounted on the upper side of the stationary bottom is a plate 136 carrying rods 138, and this plate is adjustable laterally with relation to the length of the magazine. As shown in Fig. 7 slots 140 are provided in the movable bottom for the rods 134 to move in and slots 142 are provided for the rods 138. It will be noticed from Fig. 8 that the plate 136 and the rods 138 may be pulled entirely out of the magazine when the door 120 is opened for refilling the magazine.

The envelops or work sheets are fed out of the top of the magazine by the following mechanism. A lever 144 pivoted at 146 and normally held down by the spring 148 has the front end 145 thereof within reach of the operator. Upper and lower adjustable stops 150 are provided to limit the rotation of the platen of the second machine when the lever 144 is operated. The rear end of the lever 144 has pivoted to it a connecting rod 152 which at its upper end is pivoted at 153 to an arm 154 secured to a shaft 156 rotatably mounted above the magazine. A spring-pressed pawl 158 is mounted on the pivot 153 between the rod 152 and the arm 154, as shown in Fig. 18, and this pawl has a tail piece 160, best shown in Fig. 19. A ratchet wheel 159 is secured to the shaft 156 and a projection 162 on the magazine serves to engage the tail piece 160 and disengage the pawl from the ratchet. A gear 164 on the shaft 156 meshes with a long gear 166 best shown in Fig. 2, which is mounted on the carriage of the second machine. The gear 166 meshes with an intermediate gear 168 and this gear in turn meshes with a gear 170 secured to the platen of the second machine. A projection 172 on the rod 152 as shown in Fig. 18 engages an arm 174 connected to an arm 176 which is pivoted at 178 and is engaged by a spring 177, while the connection between the arms 174 and 176 is by means of a hinge 180. 182 is a spring tending to keep the arm 174 in the same plane as the arm 176, and 173 is a projection secured to the magazine which engages and swings the arm 174. A projection 184 on the upper end of the arm 176 slides in a slot 186 in an arm 188 fast to a sleeve 190 which has a key 192 engaged in a keyway in a collar 194 adjustable by means of a set-screw 196 as shown in Fig. 18. Rigid on the collar 194 is an arm 198 pivotally connected to a push rod 200 which constitutes a feeder for the envelops. On the rod 200 is a cam 202 adapted to engage a projection 204 on the top of the magazine. The point of the rod 200 is adapted to engage under the flap 203 of the upper envelop of the stack of envelops 205 as shown in Fig. 16. Springs 206 on the magazine engage over the envelops and when the push rod 200 is lifted by the projection 204, an envelop is forced off these springs, which immediately return into engagement with the underlying envelop and retain the same. The push rod continues to advance the envelop until it is forced between a roller 208 and the platen 87. The roller 208 is shorter than the shortest envelop intended to be used and is carried by spring-pressed arms 215 pivoted to the frame of the carriage. The rollers 210 are the full length of the platen and are carried by spring-pressed arms 211 pivoted to the carriage. Rollers 212, one for each end of the envelop, are provided, and these rollers are mounted on arms 214 on a square shaft 216. An arm 218 on this shaft is engaged by a spring 220. Guides 221 of usual form are provided for guiding the envelops, while a guide 222 is provided for putting in the envelop or work sheets by hand when desired. 224 Fig. 3 indicates a spring device for moving the carriage laterally in one direction.

Figs. 20, 21 and 22 illustrate a modification which is employed when the two machines are built together, and not separately as in the main form of invention previously described. The key-bars of the first machine are extended as shown at 226 and are pivoted at 228 on fixed pivots. Bars 230 have their forked ends pivoted on the same pivots and lie underneath the bars 226. Pivoted on the ends of the bars 230 are the connecting rods 232 having their upper ends connected to the bell cranks 110 in a manner similar to the rods 108, as in the preferred form of device. Arms 234 on the bars 230 have pivots 236 for members 238 which are provided with slots 240. A rod 242 lies in the slots 240 and is adapted to move in slots 244 in each side of the frame. Springs 246 hold the rod 242 against cams 248 which are secured to a rod 249 rotatably mounted in the frame. The connections from the cams are the same as in the previously-described construction, and the catch lever 22 is also the same except that a spring 40' is used in place of the spring 40. Fig. 20 shows the key-connecting mechanism in its engaging position, while Fig. 22 shows it in its disengaged position.

The operation and advantages of my improved machine will readily be understood from the foregoing description. Upon the operator depressing any one of the keys of the ordinary keyboard, the connecting key-bar 4 of the first machine will be operated to actuate the proper type-bar of the first machine, and by means of the connections between the key-bar and the corresponding type bar 114 of the second machine the envelop therein will be impressed with the same character. When the key is released the upper lever 8 returns the type bar of the second machine in unison with the type bar of the first machine. Since the carriage 52 of the second machine is connected by the bars 74 to the carriage of the first machine, the carriages of the two machines will move step by step from right to left while a line is being typewritten and will be returned again from left to right into position for writing another line.

In order to feed another envelop or work sheet into position to be typewritten by the second machine, the operator depresses the end 145 of the lever 144 and raises the rod 152 against the tension of the spring 148. This swings the arm 154 and lifts the end 160 of the pawl 158 off the stop 162, allowing the pawl to engage the ratchet 159 and rotate the gear 164 secured to the shaft 156, which in turn rotates the long gear 166 and through the intermediate gear 168 turns the gear 170 secured to the platen of the second machine in the proper direction for feeding in envelops. As the rod 152 is moved up the arm 174, resting upon the projection 172, is moved and communicates motion to the arm 188 connected to the sleeve 190 and carrying with it the collar 194 to which the arm 200 is connected, thus giving a shifting motion to said arm which engages under the flap 203 of the upper envelop in the magazine. When the cam 202 engages the projection 204 the envelop is lifted above the retaining spring 206 and the spring then snaps back and retains the underlying envelop in position. The motion of the arm 200 is continued until the envelop is firmly engaged between the short roller 208 and the platen. The arm 174 then reaches a position where it is disengaged from the projection 172 and is shoved off by the projection 175, thus allowing the spring 177 to return the feeding mechanism to initial position. The motion communicated to the platen is continued until the proper position of the envelop or work sheet is reached, which may be adjusted by the stop 150 which limits the motion of the lever 144. In order to refill the magazine the ends of the cords 130 are detached, which allows the movable bottom to drop by gravity. The door 120 being open the slidable plate 136 carrying the rods 138 may be removed and a new stack of envelops inserted in the magazine. Ordinary envelops are used and hence the expense of special envelops such as the window type is avoided.

The operation of the line-spacing mechanism will readily be understood by reference to Figs. 1, 13, 14, 15. The rod 82 is operated from the bar 76 connected with a moving part of the line-spacing mechanism of the usual typewriter, which moving part ordinarily always has a motion corresponding to three spaces regardless of how the machine is set for spacing. The rod 76 swings on the arm 80 which carries the rod 78, thus actuating the latter rod and also the rod 82. The rod 82 has the slot 88 in which lies the pin 90 on the curved bar 92, and the position of this pin in the slot is regulated by adjusting the member 102 to place the pin in different positions in the slot. The platen of the second machine may thus be shifted through one, two or three spaces while at the same time the spacing mechanism of the first machine may be set to shift its platen through one, two or three spaces.

The manner in which the carriage of the second machine can be adjusted will now be described. It will be seen from Fig. 2 that the rack 72 is rigidly secured to the carriage of the first machine by the bars 74. When the two instrumentalities are being operated in unison, the lever 22 is held in the position shown in Figs. 4 and 5 by the catch lever 32 engaging in the notch located at about the center of the catch 30. When the catch lever is released and the lever 22 is depressed by the operator, the rod 44 and the mechanism associated with its upper end is placed in the position shown in Fig. 10. The gooseneck piece 56 will be lifted out of engagement with the rack 72, thereby disconnecting the two carriages, and the carriage of the second machine can, therefore, be set in any desired position with relation to the carriage of the first machine.

The manner in which the two instrumentalities may be disconnected in order that the operator may bring the platen and the carriage of the second machine to the proper position for feeding in the envelops or work sheets, and to permit free operation of the first machine independently of the second if desired, will now be described. When the catch lever 32 is released, if the operator instead of depressing the lever 22 as above described, lets go of it, at the same time holding the carriage of the second machine then the spring 40 will pull down the rear end of the lever 22, depressing the rod 44, pulling down the gooseneck piece 56 out of engagement with the rack and at the same time placing the projection 60 in position to engage the adjustable stop 62, as shown in Fig. 11. This stop, as best shown in Fig. 2, may be set in any desired position. The spring mechanism 224 connected with the carriage of the second machine will then bring the carriage when the operator lets go of the same to the position at which the operator desires the envelops or work sheets to be fed to the platen of the second machine. They may thus be fed to the center of the platen regardless of their length so as to occupy the proper lateral position relatively to the first machine. In this manner printing may be started simultaneously with both machines with the assurance that the printing will occupy the desired place upon the envelop or work sheet. It is to be noted that the rack 72 and the rod 78 are long enough to allow for full range of adjustment of the carriage of the second machine. The lever 22 may now be returned to its central position and held there by the catch lever 32. Writing in unison on the two instrumentalities may now be resumed. However, if the lever 22 is left in its upper position in the catch 30, the first machine may be operated entirely independently of the second machine. This will be apparent from Fig. 9, and is due to the cams 18 letting down the rod 16 and the bars 6 which are rigid therewith, so that these bars are no longer in a position to be engaged by the key bars of the first machine.

I claim:

1. A typewriting machine comprising a main and an auxiliary printing device, two platen carriages associated respectively with said printing devices, a manually operated lever adapted to be placed in two different positions, means operated by said lever which, in one of said positions connects said carriages for movement in unison and in the other of said positions disconnects them from each other, means tending to automatically move the auxiliary carriage in one direction, and an adjustable stop which, when said carriages are disconnected, limits the amount of movement of the auxiliary carriage in such direction.

2. A typewriting machine comprising a main and an auxiliary printing device, two platen carriages, associated respectively, with said printing devices, a manually operated lever adapted to be placed in three different positions, means operated by said lever which in one of said positions connects said carriages for movement in unison and in the two remaining positions disconnects them from each other, means tending to automatically move the auxiliary carriage in one direction, and an adjustable stop which when said carriages are disconnected in one position of said lever, limits the amount of movement of the auxiliary carriage in such direction.

3. A typewriting machine, comprising a main and an auxilary printing device, two platen carriages associated respectively with said printing devices, a manually operated lever adapted to be placed in two different positions, a rack bar attached to the main carriage, a movable member attached to the auxiliary carriage, and connections between said movable member and said lever which in one position of said lever cause said movable member to engage said rack bar and in the other position of said lever, cause said movable member to disengage said rack bar.

4. A typewriting machine comprising a main and an auxiliary printing device, two platen carriages associated respectively with said printing devices, a manually operated lever adapted to be placed in two different positions, a rack bar attached to the main carriage, a movable member attached to the auxiliary carriage, connections between said movable member and said lever which, in one position of said lever cause said movable member to engage said rack bar and in the other position of said lever cause said movable member to disengage said rack bar, means tending to automatically move the auxiliary carriage in one direction, an adjustable stop adapted to be engaged by said movable member when the latter is in its disengaged position.

5. A typewriting machine comprising a main and an auxiliary printing device, two platen carriages associated respectively with said printing devices, line-spacing mechanism associated with each of the platens, connections for operating the auxiliary line-spacing mechanism from the main line-spacing mechanism, and means for setting the auxiliary line-setting mechanism for different spacing regardless of the spacing for which the main line-spacing mechanism is set.

6. A typewriting machine comprising two printing devices, each of which is provided with a series of key bars and associated type-bars, keys for operating the key bars of one printing device, connections between the key bars of the two printing devices whereby they may be caused to operate in unison, a hand lever having an end adjacent said keys and means operated by said hand lever for rendering said connections operative or inoperative at the will of the operator.

7. A typewriting machine comprising two printing devices, each of which is provided with a series of key bars and associated type bars, keys for operating the key bars of one printing device, connections between the key bars of the two printing devices whereby they may be caused to operate in unison, a hand lever having an end adjacent said keys, a cam mounted for rotation by said hand lever, and means controlled by said cam for rendering said connections operative or inoperative at the will of the operator.

8. A typewriting machine comprising two printing devices, each of which is provided with a series of key bars and associated type bars, keys for operating the key bars of one printing device, connections between the key bars of the two printing devices whereby they may be caused to operate in unison, a hand lever having an end adjacent said keys, a cam mounted for rotation by said hand lever, and a rod passing through the key bars of one printing device and secured to said connections, said rod being engaged by said cam whereby said connections will be rendered operative or inoperative according to the position of said cam.

9. A typewriting machine comprising two printing devices, each of which is provided with a series of key bars, associated type bars and a platen, connections between the key bars of the two printing devices whereby they may be caused to operate in unison, a magazine associated with one of the printing devices, manually operated means for feeding envelops or work sheets one at a time from said magazine to the platen of the printing devices associated therewith, means for connecting said printing devices for lateral movement in unison, and means for adjusting the relative position of said connecting means whereby envelops or work sheets of different lengths may be fed to the desired lateral position upon said last mentioned platen for starting printing simultaneously with both machines.

10. A typewriting machine comprising two printing devices each of which is provided with a series of keybars, associated type-bars and a platen, connections between the key-bars of the two printing devices, whereby they may be caused to operate in unison, a magazine associated with one of the printing devices, manually operated means for feeding envelops or work sheets one at a time from said magazine to the platen of the printing device associated therewith, adjustable means for limiting the position to which the envelops or work sheets are fed, means for connecting said printing devices for lateral movement in unison, and means for adjusting the relative position of said connecting means whereby envelops or work sheets of different lengths may be fed to the desired lateral position upon said last mentioned platen for starting printing simultaneously with both machines.

11. A typewriting machine comprising two printing devices, each of which is provided with a series of key bars, associated type bars and a platen, connections between the key bars of the two printing devices whereby they may be caused to operate in unison, a magazine associate   vith one of the printing devices, a hand  ver having an end adjacent the keys, means operated by said hand lever for feeding envelops or work sheets one at a time from said magazine to the platen of the printing device associated therewith, means for connecting said printing devices for lateral movement in unison, and means for adjusting the relative position of said connecting means whereby envelops or work sheets of different lengths may be fed to the desired lateral position upon said last mentioned platen for starting printing simultaneously with both machines.

12. A typewriting machine comprising two printing devices, each of which is provided with a series of key bars, associated type bars and a platen, connections between the key bars of the two printing devices whereby they may be caused to operate in unison, a stationary magazine associated with one of the printing devices below the platen thereof, a hand lever having an end adjacent the keys, means operated by said hand lever for feeding envelopes or work sheets one at a time from the top of said magazine to said platen, means for connecting said printing devices for lateral movement in unison, and means for adjusting the relative position of said connecting means whereby envelops or work sheets of different lengths may be fed to the desired lateral position upon said last mentioned platen for starting printing simultaneously with both machines.

In testimony whereof I hereunto affix my signature.

GAILEN F. MAPES.